United States Patent
Manjunath et al.

(10) Patent No.: US 11,640,332 B1
(45) Date of Patent: May 2, 2023

(54) EXECUTE IN PLACE ARCHITECTURE WITH INTEGRITY CHECK

(71) Applicant: Infineon Technologies AG, Neubiberg (DE)

(72) Inventors: Sunanda Manjunath, Munich (DE); Jens Rosenbusch, Munich (DE)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 17/502,300

(22) Filed: Oct. 15, 2021

(51) Int. Cl.
*G06F 11/00* (2006.01)
*G06F 11/10* (2006.01)
*G06F 11/16* (2006.01)
*G06F 11/07* (2006.01)

(52) U.S. Cl.
CPC ...... *G06F 11/1004* (2013.01); *G06F 11/0772* (2013.01); *G06F 11/1068* (2013.01); *G06F 11/167* (2013.01)

(58) Field of Classification Search
None
See application file for complete search history.

(56) References Cited

U.S. PATENT DOCUMENTS

| | | | | |
|---|---|---|---|---|
| 5,619,642 A * | 4/1997 | Nielson | ............... | G06F 11/2087 714/42 |
| 6,009,547 A * | 12/1999 | Jaquette | .................. | G06F 11/10 710/52 |
| 9,362,913 B1 * | 6/2016 | Schmit | ............. | H03K 19/00369 |
| 10,606,829 B1 * | 3/2020 | Chickanosky | ...... | G06F 16/2365 |
| 2002/0071421 A1 * | 6/2002 | Chiu | ..................... | H04L 1/1809 370/349 |
| 2010/0192052 A1 * | 7/2010 | Jiang | ................... | G06F 11/0766 714/E11.032 |

(Continued)

OTHER PUBLICATIONS

D. Arora, S. Ravi, A. Raghunathan and N. K. Jha, "Hardware-Assisted Run-Time Monitoring for Secure Program Execution on Embedded Processors," in IEEE Transactions on Very Large Scale Integration (VLSI) Systems, vol. 14, No. 12, pp. 1295-1308, Dec. 2006, doi: 10.1109/TVLSI.2006.887799. (Year: 2006).*

(Continued)

*Primary Examiner* — Daniel F. McMahon
(74) *Attorney, Agent, or Firm* — Eschweiler & Potashnik, LLC

(57) ABSTRACT

Systems, methods, and circuitries are provided for checking integrity of code received from an external memory. In one example, a system includes a non-volatile memory and a controller. The non-volatile memory includes a first partition configured to store first data corresponding to program code and a second partition configured to store second data corresponding to a copy of the first data. The controller that includes a processor and comparator circuitry. The comparator circuitry is configured to receive a portion of the first data and a corresponding portion of the second data, compare the portion of the first data to the portion of the second data, when the portion of the first data matches the portion of the second data, provide the portion of the first data to the processor, and when the portion of the first data does not match the portion of the second data, generate an alarm signal.

20 Claims, 4 Drawing Sheets

(56) References Cited

U.S. PATENT DOCUMENTS

| | | | | |
|---|---|---|---|---|
| 2011/0082970 A1* | 4/2011 | Rohleder | ............. | G11C 7/1075 |
| | | | | 711/E12.007 |
| 2011/0083041 A1* | 4/2011 | Rohleder | ............... | G11C 29/74 |
| | | | | 714/15 |
| 2012/0331339 A1* | 12/2012 | Schmidt | ................... | G05B 9/02 |
| | | | | 714/15 |
| 2018/0039538 A1* | 2/2018 | Freikorn | ............. | G06F 11/1048 |
| 2019/0205244 A1* | 7/2019 | Smith | ..................... | G06F 3/065 |
| 2021/0311827 A1* | 10/2021 | Lu | ......................... | G06F 3/0611 |
| 2021/0311832 A1* | 10/2021 | Boschi | ................... | G06F 11/10 |

OTHER PUBLICATIONS

F. -J. Streit et al., "Secure Boot from Non-Volatile Memory for Programmable SoC Architectures," 2020 IEEE International Symposium on Hardware Oriented Security and Trust (HOST), 2020, pp. 102-110, doi: 10.1109/HOST45689.2020.9300126. (Year: 2020).*

* cited by examiner

EXECUTE IN PLACE ARCHITECTURE WITH INTEGRITY CHECK

FIELD

The present disclosure relates to the field of microcontroller units (MCUs) and central processing units (CPUs) that execute instructions stored in an external memory.

BACKGROUND

Modern integrated circuits are fabricated using deep submicron technologies. This greatly increases the cost of embedded non-volatile memory.

BRIEF DESCRIPTION OF THE DRAWINGS

Some examples of circuits, apparatuses and/or methods will be described in the following by way of example only. In this context, reference will be made to the accompanying Figures.

DETAILED DESCRIPTION

Controllers used in safety related applications employ information redundancy measures to protect against erroneous operation. For example, to be classified as Automotive Safety and Integrity Level D (ASIL-D), a controller system on chip (SoC) should include some type of verification measure for program code that is being executed. One way to verify program code received from an external (with respect to the SoC) memory is to first copy the program code into an internal (with respect to the SoC) static random access memory (SRAM). Prior to executing the program code the controller may compute an error detection code (EDC) based on the copied program code and check the computed EDC against a stored EDC that was received with the program code. One example of an EDC is a cyclic redundancy check (CRC) code.

Due to the processing necessary to compute the EDC and the memory used to store the EDC, the EDC is typically computed based on the entire program code or on fairly large portions of the program code. To allow for verification of the program code, the portion of the program code that is copied into the internal SRAM of an ASIL-D certified SoC should have a precomputed EDC that covers the entire portion. This means that the entire program code or a large portion of the program code will be copied into internal SRAM to allow for verification. As the cost of SRAM is high, it may be costly to provide sufficient internal SRAM to store such large amounts of program code. One solution would be to compute EDCs for smaller portions of program code. However, this involves additional processing to compute many EDCs and memory for storing the many EDCs. Further, this approach adds runtime latency as the many EDCs are computed and checked.

The following description outlines systems, methods, and circuitries that enable verification of externally stored program code as the program code is received by an SoC interface. The verification of the program code may be performed on a per-word, or other fine granular basis.

Figure 1:
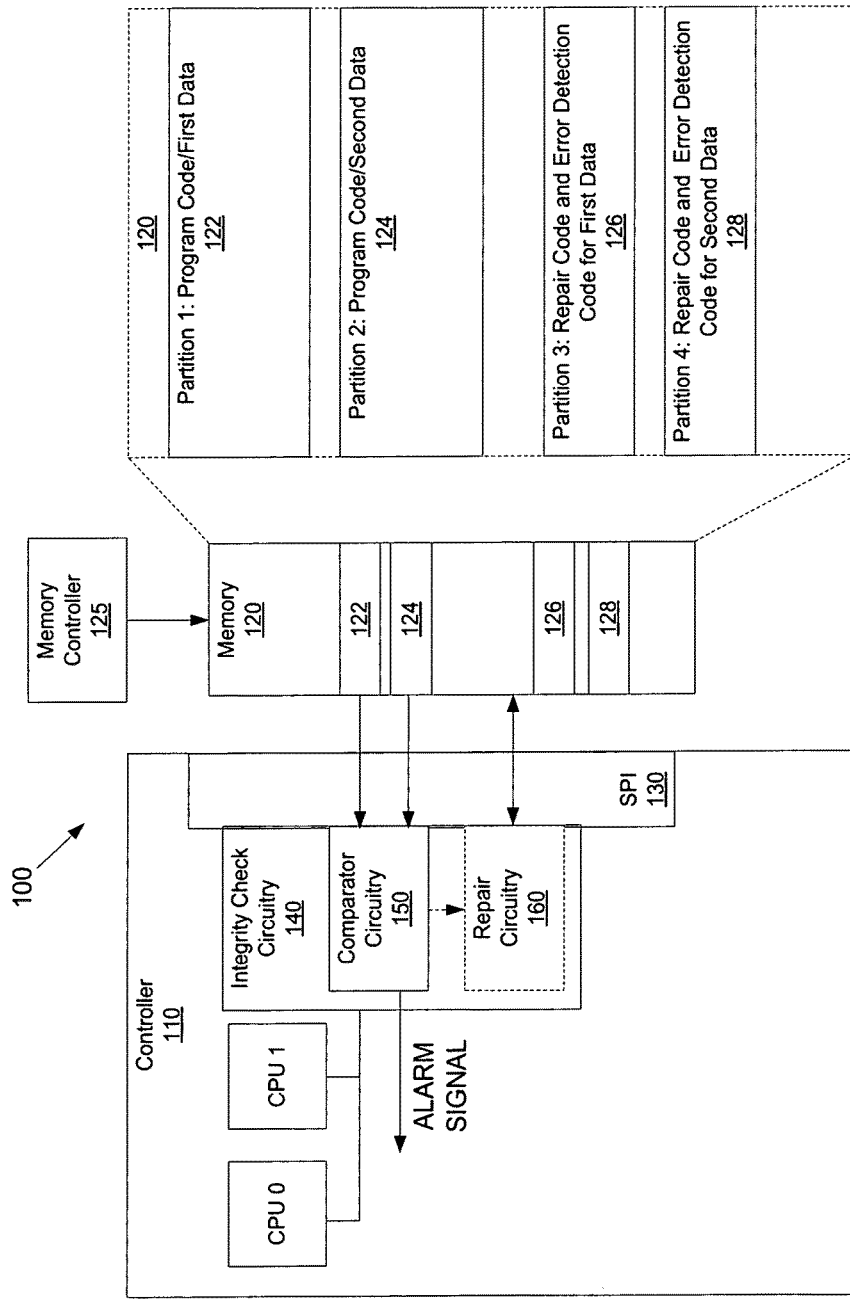
FIG. 1 is a block diagram of an exemplary architecture that includes a controller having integrity check circuitry that verifies the integrity of instructions read from an external memory, in accordance with various aspects described.

FIG. 1 illustrates an example of controller system 100 that includes a controller SoC 110, an external memory 120, and a memory controller 125. The controller SoC 110 includes one or more processors (CPU 0, CPU 1) and a serial peripheral interface (SPI) 130. The SPI 130 is configured to transmit data to and receive data from the external memory 120. In one example, the SPI 130 receives/transmits data a word at a time. While an SPI is used as an interface in the described system, any type of interface that can be used to read and write small portions of data to the external memory 120 may be used.

The controller SoC 110 also includes integrity check circuitry 140 that verifies program code data as it is received by the SPI 130. Operation of the integrity check circuitry 140 will be described in more detail below.

The external memory 120 is configured to include a first partition 122 that stores first data corresponding to program code. The external memory 120 is configured to include a second partition 124 that stores second data corresponding to a copy of the program code. For the purposes of this description, the term "partition" is to be construed as including any predefined or allocated portion of memory media that is designated for storing a certain set of data (e.g., first data, second data, an EDC, and so on). In one example, a partition may be a physical sector in a non-volatile memory.

The term "copy" is to be construed broadly as meaning data that is derived from the first data and can be used to verify and recover the first data. Thus the second data may be an exact duplicate of the first data. In other examples, the second data corresponds to an inverted copy of the first data. In other examples, the second data corresponds to other versions of the first data that can be used to verify and recover the first data.

A third partition 126 of the external memory stores an EDC (e.g., CRC) computed for the program code stored in the first partition 122. The third partition 126 may also store repair code that, when executed by the controller SoC 110, causes the integrity of the program code stored in the first partition 122 to be verified using the EDC stored in the third partition 126. A fourth partition 128 of the external memory stores an EDC (e.g., CRC) computed for the copy of the program code stored in the first partition 124. The fourth partition 128 may also store repair code that, when executed by the controller SoC, causes the integrity of the copy of the program code stored in the second partition 124 to be verified using the EDC stored the fourth partition 128. In some examples, the first partition, the second partition, the third partition, and the fourth partition are non-overlapping to insulate against regionally focused memory errors.

The integrity check circuitry 140 includes comparator circuitry 150 and repair circuitry 160. The comparator circuitry 150 may be a lockstep comparator. The comparator circuitry is configured to receive, through the SPI 130, a portion (e.g., a word) of the first data stored in the first partition 122. The comparator circuitry 150 is configured to also receive, through the SPI 130, a portion (e.g., a word) of the second data stored in the first partition 124. The received portion of the second data corresponds to the received portion of the first data. In one example, the received portion of the second data corresponding to the portion of the first data means that the received portion of the second data is located within the second partition at the same relative location that the portion of the first data is located in the first partition. In other words, the portion of the second data that corresponds to the portion of the first data is, if uncorrupted, a copy of the portion of the first data, if the portion of the first data is uncorrupted.

The comparator circuitry 150 compares the portion of the first data and the portion of the second data and, if the portions match, provides the first data (or second data) to the processors CPU 0, CPU 1 for execution. For the purposes of this description, the term "match" is to be construed in a broad sense as meaning determining that the received portion of the second data is aligned with or is otherwise equivalent to the received portion of the first data. In one example, the received portions match when each corresponding bit in the portions match. In another example, the received portions match when each pair of corresponding bits the portions are opposite (e.g., when the second data is an inverted copy of the first data).

Figure 2:
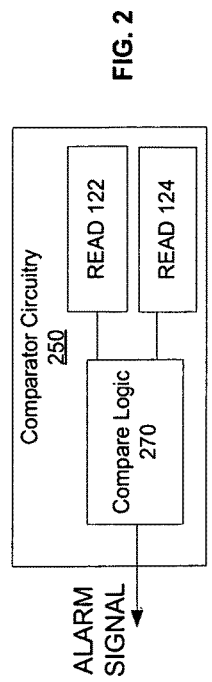
FIG. 2 is a block diagram of an exemplary comparator circuitry, in accordance with various aspects disclosed.

FIG. 2 illustrates an exemplary comparator circuitry 250 that is implemented using a lockstep comparison technique. The comparator circuitry 250 includes compare logic 270 that compares two locked CPU outputs, the output of the read operation on partition 122 and the read operation on partition 124. In one example, the compare logic 270 may implement an XOR operation (e.g., when the partition 124 stores a duplicate of the data in partition 122). In another example, the compare logic 270 may implement an XNOR operation (e.g., when the partition 124 stores an inverted copy of the data in partition 122). The compare logic 270 outputs the alarm signal when the outputs of the two locked read operations do not match. The compare logic 270 may also trigger repair circuitry 160 when the outputs of the two locked read operations do not match.

Returning to FIG. 1, when the portion of the first data and the portion of the second data do not match, the comparator circuitry 150 generates the alarm signal that indicates that there is an error in the transfer of program code from the external memory 120 to the processors. In this manner, the comparator circuitry 150 verifies the integrity of the received program code in real time based on the comparison of the received portion of first data and the received portion of second data. No runtime latency is introduced when the received portions of first data and second data match. When the received portions of first data and second data do not match, the comparator circuitry 150 generates an alarm signal so that measures can be taken to prevent possibly corrupted program code from being executed by the processors. In one example, the alarm signal is an interrupt signal.

The alarm signal may trigger any number of actions within the controller system 100. For example, the alarm signal may trigger controller system 100 to take some action to attempt to diagnose and repair corrupted data in the first partition 122 or the second partition 124. In one example, the alarm signal triggers the memory controller 125 to perform a repair routine that includes performing an EDC check on the first data in first partition 122 and the second data in second partition 124 based on the EDCs stored in the third partition 126, and fourth partition 128, respectively. If one of the first data or the second data fails the EDC check (e.g., is corrupted) while the other of the first data or the second data passes the EDC check (e.g., is uncorrupted), the repair routine includes replacing the corrupted first or second data with a copy of the uncorrupted first or second data and computing and storing an EDC for the copy of the uncorrupted first or second data.

In the illustrated example, when the comparator circuitry 150 generates the alarm signal, the comparator circuitry also triggers the repair circuitry 160 to cause the controller SoC 110 to perform the repair routine. The repair circuitry 160 fetches repair code or repair instructions from the third partition 126. The repair code, when executed by the processors CPU 0, CPU 1, performs the repair routine. The repair circuitry 160 fetches the EDC for the first data from the third partition 126. The processors CPU 0, CPU 1 execute the repair code to read the first data through the SPI 130 and compute an EDC for the first data. The computed EDC is compared to the EDC that was stored in the third partition 126 to determine if the first data is corrupted. The repair circuitry 160 fetches the repair code and EDC for the second data from the fourth partition 128. The processors CPU 0, CPU 1 execute the repair code to read the second data through the SPI 130 and compute an EDC for the second data. The computed EDC is compared to the EDC that was stored in the fourth partition 128 to determine if the second data is corrupted.

If only one of the first data or the second data is corrupted, the repair circuitry 160 causes the replacement of the corrupted first or second data with a copy of the uncorrupted first or second data. The repair circuitry 160, CPU 0/CPU 1, or the memory controller 125 computes and stores an EDC for the copy of the uncorrupted first or second data. Then execution of the program code may restart without repair.

In some examples, the repair code is stored in SRAM in the controller SoC 110 rather than the external memory 120. In some examples, the repair code is stored in the third partition 126 and a copy of the repair code is stored in the fourth partition 128 and the comparator circuitry 150 is used to verify the integrity of the repair code by comparing the repair code program data between the copies prior to execution of the repair code.

If the repair routine determines that neither the first data nor the second data is corrupted, then it may assumed that the fault was transient and the execution of the program code may continue. The alarm signal may be terminated.

In some examples, in addition to generating the alarm signal, the comparator circuitry 150 may also take affirmative actions to prevent the potentially corrupted data from being provided to the processors.

It can be seen that the verification of the first data and second data using the EDC is only performed in response to a mismatch between the first data and the second data. This means that runtime latency is not affected by performance of an EDC check except in instances when it appears that either the first data or second data is corrupted.

In some aspects, the code verification techniques described herein may leverage existing memory partitioning schemes used to enable software-over-the-air (SOTA) updates. To enable SOTA, memory storing operating code is configured to include at least two partitions (e.g., partitions 122, 124). A first partition stores the version of the operating code that is in use while a second partition stores the immediately prior version of the code. When new program code is received in a SOTA update, the memory controller 125 stores new first data corresponding to the new program code in the second partition that stores the immediately prior version of the program code. The memory controller computes an EDC for the stored new first data and compares the computed EDC with a received EDC. When the computed EDC matches the received EDC, the memory controller 125 stores the EDC (e.g., in either the third partition 126 or fourth partition 128). At this point, the SoC begins operating based on the new program code stored in the second partition. The first partition continues to store what is now the immediately previous version of the program code in case it becomes desirable to switch operation back to the previous version of the program code.

To enable the code verification techniques described herein, this two partition scheme may be used such that after verification of the program code received in the SOTA update a copy of the verified program code may be stored in the other partition. This means that rather than storing a current version of the program code in one partition and a previous version of the program code in the other partition, both partitions store the current version of the program code. Thus the SOTA update process may be updated as follows.

The memory controller 125 makes a copy of the first data to generate the second data. The memory controller 125 stores the second data in the second partition 124 and computes a second EDC for the stored second data. If the computed EDC for the stored second data matches the EDC for the first data, the memory controller stores the EDC in the fourth partition 128.

When the copy of the first data is an inverted copy, after the inversion is performed, a target EDC is computed for the write data. After the write data is stored in the second partition 124, the data may be read back from the second partition and an EDC may be computed for the read back data. If the computed EDC matches the target EDC then the second data is confirmed.

It can be seen from the foregoing description that the described solutions allow an unmodified external memory that stores program code and a copy of the program code to support real time verification of program code being fetched for execution by an SoC. The described solutions may also support diagnostic coverage without an access penalty in the program fetch path.

Following are several flow diagrams outlining example methods. In this description and the appended claims, use of the term "determine" with reference to some entity (e.g., parameter, variable, and so on) in describing a method step or function is to be construed broadly. For example, "determine" is to be construed to encompass, for example, receiving and parsing a communication that encodes the entity or a value of an entity. "Determine" should be construed to encompass accessing and reading memory (e.g., lookup table, register, device memory, remote memory, and so on) that stores the entity or value for the entity. "Determine" should be construed to encompass computing or deriving the entity or value of the entity based on other quantities or entities. "Determine" should be construed to encompass any manner of deducing or identifying an entity or value of the entity.

As used herein, the term identify when used with reference to some entity or value of an entity is to be construed broadly as encompassing any manner of determining the entity or value of the entity. For example, the term identify is to be construed to encompass, for example, receiving and parsing a communication that encodes the entity or a value of the entity. The term identify should be construed to encompass accessing and reading memory (e.g., device queue, lookup table, register, device memory, remote memory, and so on) that stores the entity or value for the entity.

Figure 3:
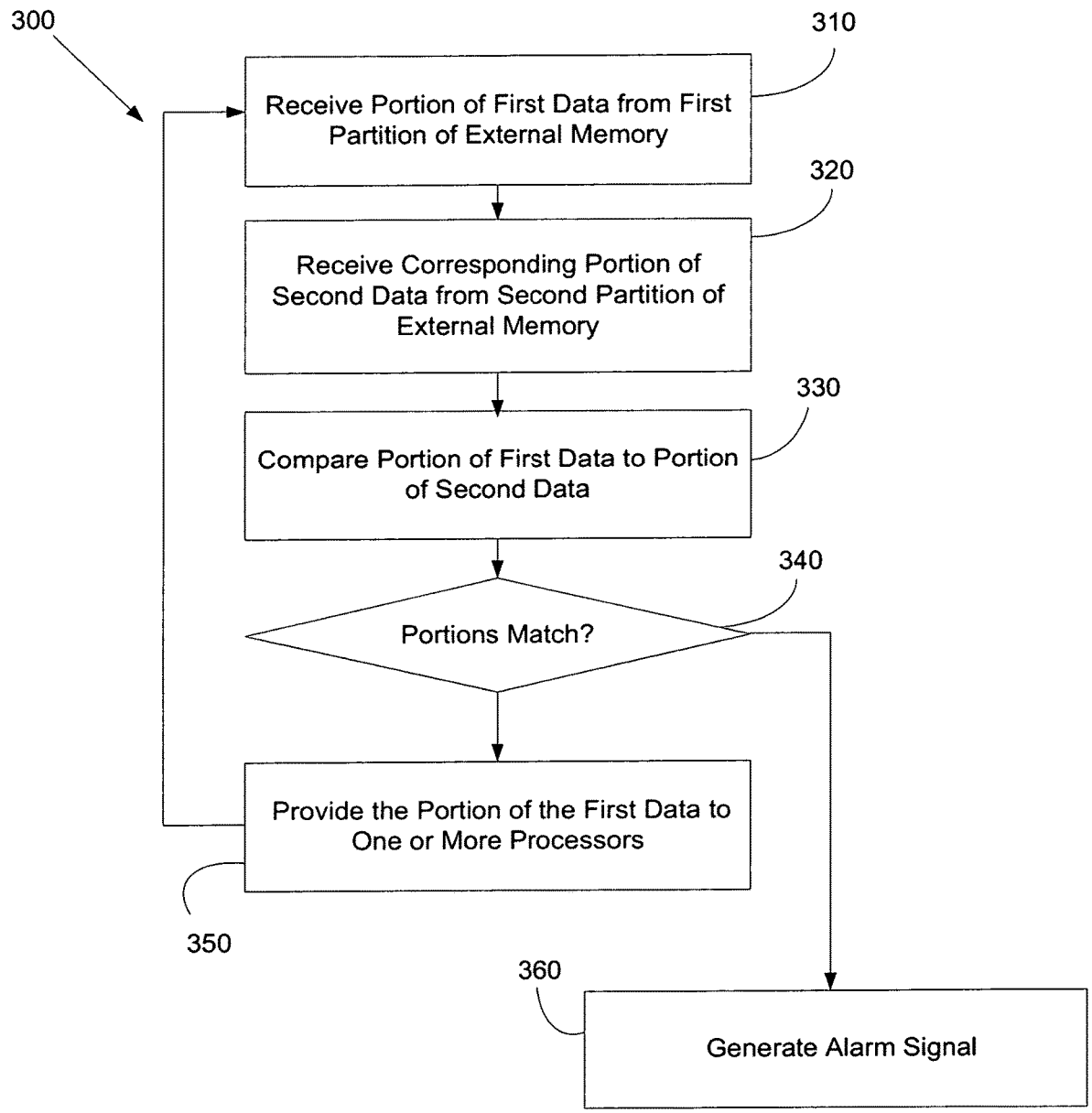
FIG. 3 is a flow diagram outlining an exemplary method of verifying the integrity of instructions read from an external memory, in accordance with various aspects described.

FIG. 3 is a flow diagram outlining an example method 300 for verifying program code fetched from an external memory. The method may be performed, for example, by the integrity check circuitry 140 of FIG. 1. The method includes, at 310, receiving a portion of first data from a first partition of an external memory. The first data corresponds to a program code. The method includes, at 320, receiving a corresponding portion of second data from a second partition of the external memory, wherein the second data corresponds to a copy of the first data. The first and second portions of data may be, for example, a word. The second data may be an inverted copy of the first data.

The method includes, at 330, comparing the portion of the first data to the portion of the second data. At 340, when the portion of the first data matches the portion of the second data, the portion of the first data is provided to one or more processors for execution At 350. At 360, when the portion of the first data does not match the portion of the second data, an alarm signal is generated. The alarm signal may be, for example, an interrupt signal that stops operation of CPU 1 and CPU 2.

Figure 4:
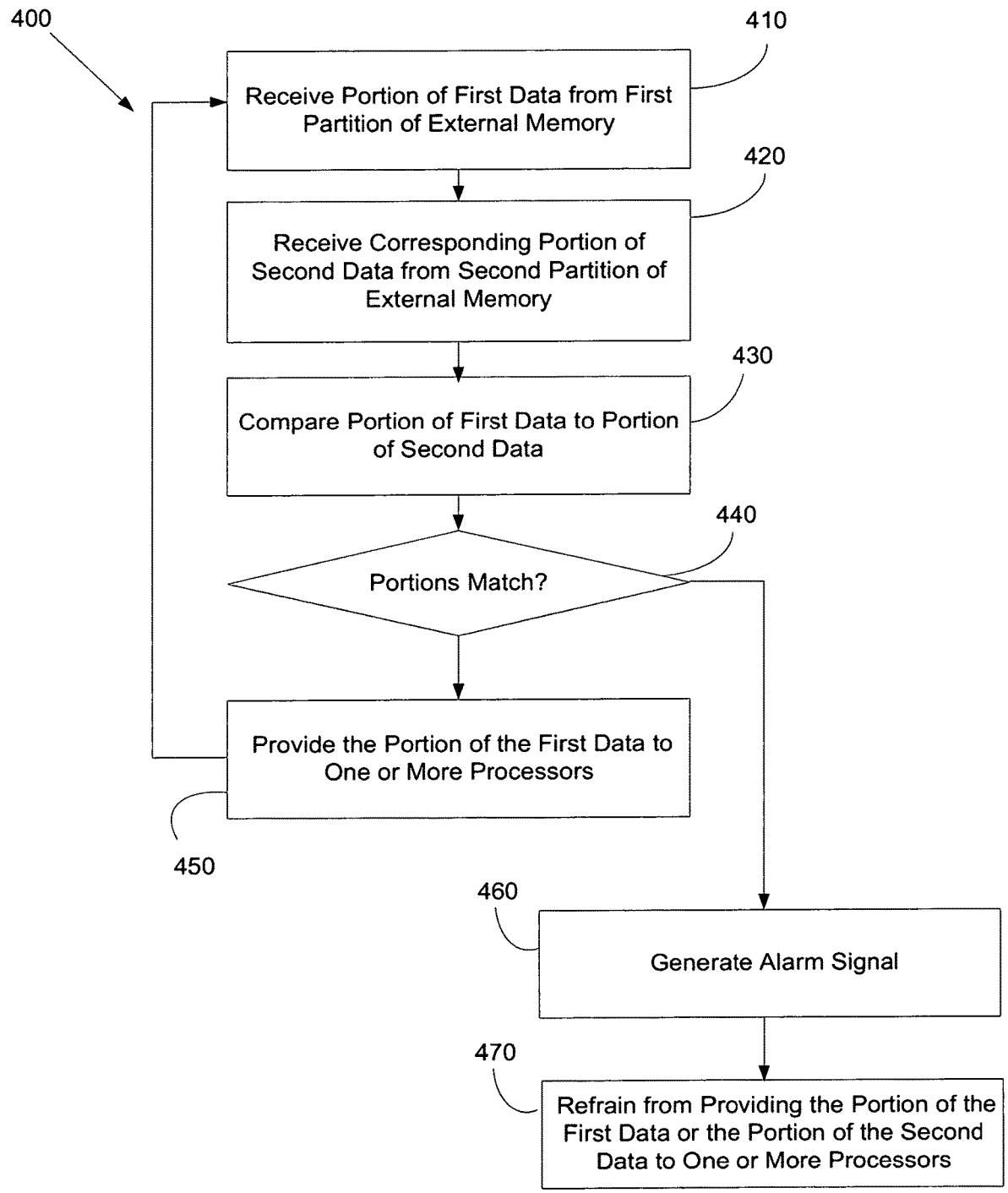
FIG. 4 is a flow diagram outlining another exemplary method of verifying the integrity of instructions read from an external memory, in accordance with various aspects described.

FIG. 4 is a flow diagram outlining an example method 400 for verifying program code fetched from an external memory. The method may be performed, for example, by the integrity check circuitry 140 of FIG. 1. The method includes, at 410, receiving a portion of first data from a first partition of an external memory. The first data corresponds to a program code. The method includes, at 420, receiving a corresponding portion of second data from a second partition of the external memory, wherein the second data corresponds to a copy of the first data. The first and second portions of data may be, for example, a word. The second data may be an inverted copy of the first data.

The method includes, at 430, comparing the portion of the first data to the portion of the second data. At 440, when the portion of the first data matches the portion of the second data, the portion of the first data is provided to one or more processors for execution at 450. At 460, when the portion of the first data does not match the portion of the second data, an alarm signal is generated. At 470, neither the portion of the first data nor the portion of the second data is provided to the one or more processors. Thus, in the method 400 in addition to generating the alarm signal, the method includes an additional affirmative action of preventing the potentially corrupted portion of data from being provided to the one or more processors.

In one example, the method 300 or the method 400 includes the following actions, taken in response to receiving the alarm signal. A first error detection code is fetched from in a third partition of the external memory and a second error detection code is fetched from a fourth partition of the external memory. The first data is verified using a first error detection code and the second data is verified using the second error detection code. When either the first data or the second data is corrupted data and that the other of the first data or the second data is uncorrupted data, the method includes repairing the corrupted data based on the uncorrupted data. In some examples, the method includes fetching repair instructions from the external memory and executing the repair code to verify the first data and the second data and repair the corrupted data.

Figure 5:
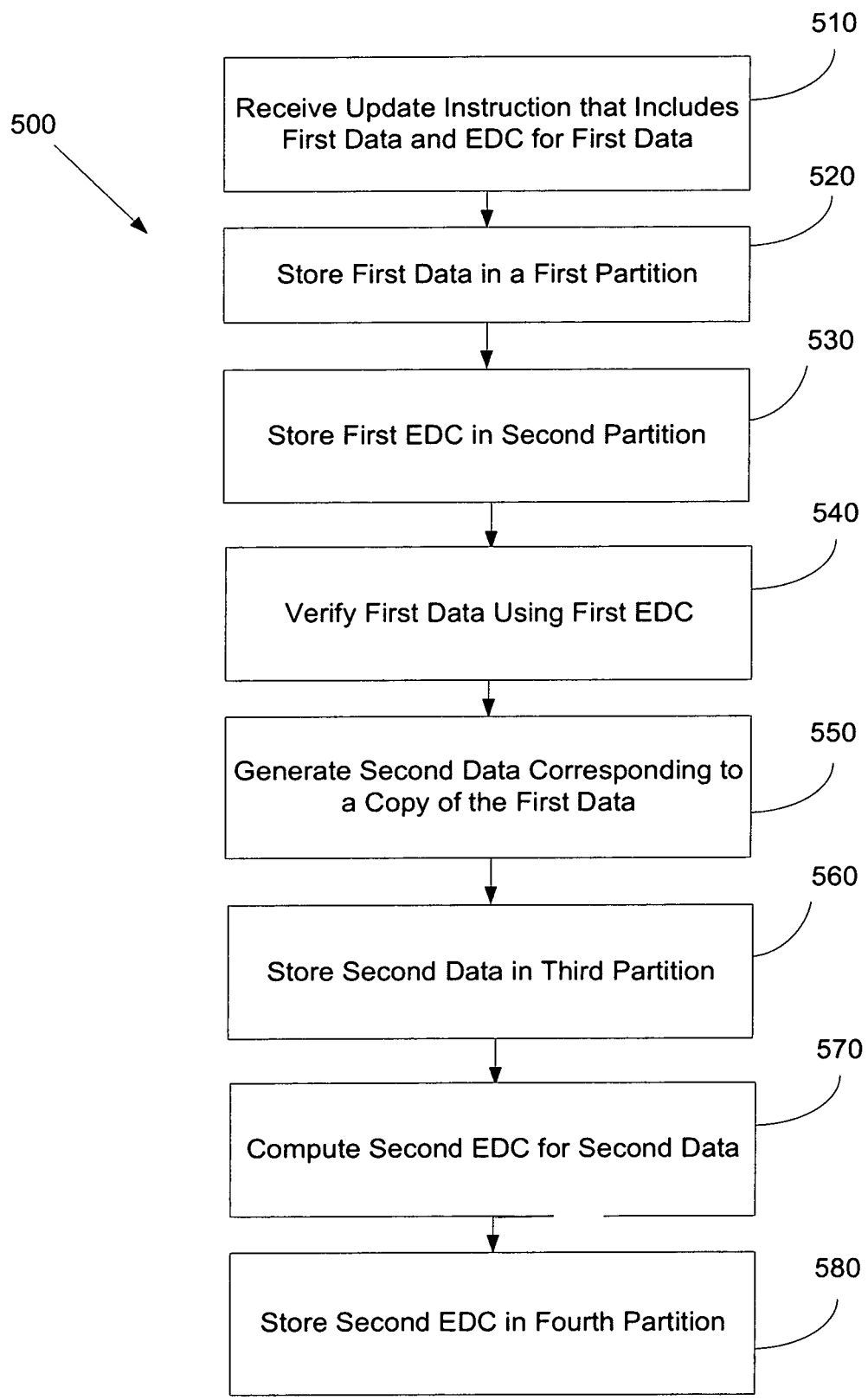
FIG. 5 is a flow diagram outlining an exemplary method of updating instructions stored in a memory, in accordance with various aspects described.

FIG. 5 is a flow diagram outlining an example method 500 for updating program code stored in a non-volatile memory. The method may be performed, for example, by the memory controller 125 of FIG. 1. The method includes, at 510, receiving an update instruction that includes first data corresponding to program code and a first error detection code for the first data. The method includes, at 520, storing the first data in a first partition of the non-volatile memory. The method includes, at 530, storing the first error detection code in a second partition of the non-volatile memory.

The method includes, at 540, verifying the first data using the first error detection code. When the first data is successfully verified, the method includes, at 550, generating second data corresponding to a copy of the first data. At 560 the second data is stored in a third partition of the non-volatile memory. At 570 a second error detection code is computed for the second data. The method includes, at 580, storing the second error detection code in a fourth partition of the non-volatile memory. In one example, the first partition, the second partition, the third partition, and the fourth partition are non-overlapping.

It can be seen from the foregoing description that the described systems, methods, and circuitries support runtime verification and integrity checking of program code with minimal latency in a fetch path and minimal impact on on-chip memory resources. The described systems, methods, and circuitries may also support repair of corrupted program code.

While the invention has been illustrated and described with respect to one or more implementations, alterations and/or modifications may be made to the illustrated examples without departing from the spirit and scope of the appended claims. In particular regard to the various functions performed by the above described components or structures (assemblies, devices, circuits, circuitries, systems, etc.), the terms (including a reference to a "means") used to describe such components are intended to correspond, unless otherwise indicated, to any component or structure which performs the specified function of the described component (e.g., that is functionally equivalent), even though not structurally equivalent to the disclosed structure which performs the function in the herein illustrated exemplary implementations of the invention.

Examples can include subject matter such as a method, means for performing acts or blocks of the method, at least one machine-readable medium including instructions that, when performed by a machine cause the machine to provide safety management on a per-application group basis according to embodiments and examples described herein.

Example 1 is a system, including a non-volatile memory and a controller. The non-volatile memory includes a first partition configured to store first data corresponding to program code and a second partition configured to store second data corresponding to a copy of the first data. The controller includes one or more processors configured to execute the program code and comparator circuitry. The comparator circuitry is configured to receive a portion of the first data and a corresponding portion of the second data, compare the portion of the first data to the portion of the second data, when the portion of the first data matches the portion of the second data, provide the portion of the first data to the one or more processors, and when the portion of the first data does not match the portion of the second data, generate an alarm signal.

Example 2 includes the subject matter of example 1, including or omitting optional elements, wherein the second data includes an inverted copy of the first data.

Example 1 includes the subject matter of example 1, including or omitting optional elements, wherein the non-volatile memory is configured to store a first error detection code computed for the first data and a second error detection code computed for the second data; and the controller includes repair circuitry configured to receive the alarm signal; in response to the alarm signal, verify the first data using the first error detection code and verify the second data using the second error detection code; based on the verifying of the first data and the verifying of the second data, determine that either the first data or the second data is corrupted data and that the other of the first data or the second data is uncorrupted data; and repair the corrupted data based on the uncorrupted data.

Example 4 includes the subject matter of example 3, including or omitting optional elements, wherein the first error detection code includes a cyclic redundancy check (CRC) code and the second error detection code includes a cyclic redundancy check (CRC) code.

Example 5 includes the subject matter of example 3, including or omitting optional elements, wherein the first error detection code is stored in a third partition of the non-volatile memory and the second error detection code is stored in a fourth partition of the non-volatile memory, wherein the first partition, the second partition, the third partition, and the fourth partition are non-overlapping.

Example 6 includes the subject matter of example 5, including or omitting optional elements, wherein the non-volatile memory stores third data encoding repair code; and the repair circuitry is configured to, in response to receiving the alarm signal, fetch the third data from the non-volatile memory; and execute the repair code encoded by the third data to verify the first data and the second data and repair the corrupted data.

Example 7 includes the subject matter of example 6, including or omitting optional elements, wherein the non-volatile memory stores fourth data corresponding to a copy of the third data; and the comparator circuitry is configured to receive a portion of the third data and a corresponding portion of the fourth data; compare the portion of the third data to the portion of the fourth data, when the portion of the third data matches the portion of the fourth data, provide the portion of the third data to the repair circuitry, and when the portion of the third data does not match the portion of the fourth data, generate an alarm signal and refrain from providing the portion of the third data or the portion of the fourth data to the repair circuitry.

Example 8 includes the subject matter of example 1, including or omitting optional elements, wherein the comparator circuitry is further configured to refrain from providing the portion of the first data or the portion of the second data to the one or more processors when the portion of the first data does not match the portion of the second data.

Example 9 is a method for updating a non-volatile memory, including receiving an update instruction that includes first data corresponding to program code and a first error detection code for the first data; storing the first data in a first partition of the non-volatile memory; storing the first error detection code in a second partition of the non-volatile memory; verifying the first data using the first error detection code; when the first data is successfully verified, generating second data corresponding to a copy of the first data; storing the second data in a third partition of the non-volatile memory, computing a second error detection code for the second data; and storing the second error detection code in a fourth partition of the non-volatile memory.

Example 10 includes the subject matter of example 9, including or omitting optional elements, wherein the error detection code includes a cyclic redundancy check (CRC) code.

Example 11 includes the subject matter of example 9, including or omitting optional elements, wherein the second data includes an inverted copy of the first data.

Example 12 includes the subject matter of example 9, including or omitting optional elements, wherein the first partition, the second partition, the third partition, and the fourth partition are non-overlapping.

Example 13 is a system on chip, including one or more processors configured to execute program code and comparator circuitry. The comparator circuitry is configured to receive a portion of first data from a first partition of an external memory, wherein the first data corresponds to the program code; receive a corresponding portion of second data from a second partition of the external memory, wherein the second data corresponds to a copy of the first data; compare the portion of the first data to the portion of the second data, when the portion of the first data matches the portion of the second data, provide the portion of the first data to the one or more processors, and when the portion of the first data does not match the portion of the second data, generate an alarm signal.

Example 14 includes the subject matter of example 13, including or omitting optional elements, wherein the second data includes an inverted copy of the first data.

Example 15 includes the subject matter of example 13, including or omitting optional elements, further including repair circuitry configured to: receive the alarm signal, and in response fetch a first error detection code stored in a third partition of the external memory; fetch a second error detection code stored in a fourth partition of the external memory; verify the first data using a first error detection code; verify the second data using the second error detection code; based on the verifying of the first data and the verifying of the second data, determine that either the first data or the second data is corrupted data and that the other of the first data or the second data is uncorrupted data; and repair the corrupted data based on the uncorrupted data.

Example 16 includes the subject matter of example 15, including or omitting optional elements, wherein the first error detection code includes a cyclic redundancy check (CRC) code and the second error detection code includes a cyclic redundancy check (CRC) code.

Example 17 includes the subject matter of example 15, including or omitting optional elements, wherein the first partition, the second partition, the third partition, and the fourth partition are non-overlapping.

Example 18 includes the subject matter of example 15, including or omitting optional elements, wherein the repair circuitry is configured to, in response to receiving the alarm signal, fetch repair code from the external memory; and execute the repair code to verify the first data and the second data and repair the corrupted data.

Example 19 is a method, including receiving a portion of first data from a first partition of an external memory, wherein the first data corresponds to a program code; receiving a corresponding portion of second data from a second partition of the external memory, wherein the second data corresponds to a copy of the first data; comparing the portion of the first data to the portion of the second data, when the portion of the first data matches the portion of the second data, providing the portion of the first data to one or more processors for execution, and when the portion of the first data does not match the portion of the second data, generating an alarm signal.

Example 20 includes the subject matter of example 19, including or omitting optional elements, wherein the second data includes an inverted copy of the first data.

Example 21 includes the subject matter of example 19, including or omitting optional elements, further including: receiving the alarm signal, and in response fetching a first error detection code stored in a third partition of the external memory; fetching a second error detection code stored in a fourth partition of the external memory; verifying the first data using a first error detection code; verifying the second data using the second error detection code; based on the verifying of the first data and the verifying of the second data, determining that either the first data or the second data is corrupted data and that the other of the first data or the second data is uncorrupted data; and repairing the corrupted data based on the uncorrupted data.

Example 22 includes the subject matter of example 21, including or omitting optional elements, wherein the first error detection code includes a cyclic redundancy check (CRC) code and the second error detection code includes a cyclic redundancy check (CRC) code.

Example 23 includes the subject matter of example 21, including or omitting optional elements, further including, in response to receiving the alarm signal, fetching repair code from the external memory; and executing the repair code to verify the first data and the second data and repair the corrupted data.

Example 24 includes the subject matter of example 19, including or omitting optional elements, further including refraining from providing the portion of the first data or the portion of the second data to the one or more processors when the portion of the first data does not match the portion of the second data.

The foregoing description of one or more implementations provides illustration and description, but is not intended to be exhaustive or to limit the scope of the example embodiments to the precise form disclosed. Modifications and variations are possible in light of the above teachings or may be acquired from practice of various implementations of the example embodiments.

Various illustrative logics, logical blocks, modules, circuitries, and circuits described in connection with aspects disclosed herein can be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform functions described herein. A general-purpose processor can be a microprocessor, but, in the alternative, processor can be any conventional processor, controller, microcontroller, or state machine.

In the present disclosure like reference numerals are used to refer to like elements throughout, and wherein the illustrated structures and devices are not necessarily drawn to scale. As utilized herein, terms "module", "component," "system," "circuit," "circuitry," "element," "slice," and the like are intended to refer to a computer-related entity, hardware, software (e.g., in execution), and/or firmware. For example, circuitry or a similar term can be a processor, a process running on a processor, a controller, an object, an executable program, a storage device, and/or a computer with a processing device. By way of illustration, an application running on a server and the server can also be circuitry. One or more circuitries can reside within a process, and circuitry can be localized on one computer and/or distributed between two or more computers. A set of elements or a set of other circuitry can be described herein, in which the term "set" can be interpreted as "one or more."

As another example, circuitry or similar term can be an apparatus with specific functionality provided by mechanical parts operated by electric or electronic circuitry, in which the electric or electronic circuitry can be operated by a software application or a firmware application executed by one or more processors. The one or more processors can be internal or external to the apparatus and can execute at least a part of the software or firmware application. As yet another example, circuitry can be an apparatus that provides specific functionality through electronic components without mechanical parts; the electronic components can include field gates, logical components, hardware encoded logic, register transfer logic, one or more processors therein to execute software and/or firmware that confer(s), at least in part, the functionality of the electronic components.

Use of the word exemplary is intended to present concepts in a concrete fashion. The terminology used herein is for the purpose of describing particular examples only and is not intended to be limiting of examples. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof. As used herein the term "or" includes the option of all elements related by the word or. For example A or B is to be construed as include only A, only B, and both A and B. Further the phrase "one or more of" followed by A, B, or C is to be construed as including A, B, C, AB, AC, BC, and ABC

What is claimed is:

1. A system, comprising:
    a non-volatile memory that includes
        a first partition configured to store first data corresponding to program code; and
        a second partition configured to store second data corresponding to a copy of the first data;
    a serial peripheral interface (SPI) configured to receive the first data and the second data from the non-volatile memory; and
    a controller that includes
        one or more processors configured to execute the program code; and
        comparator circuitry configured to
            receive a portion of the first data and a portion of the second data from the SPI, wherein the portion of the second data corresponds to portion of the first data,
            compare the portion of the first data to the portion of the second data,
            when the portion of the first data matches the portion of the second data, provide the portion of the first data to the one or more processors, and
            when the portion of the first data does not match the portion of the second data, generate an alarm signal.

2. The system of claim 1, wherein
    the non-volatile memory is configured to store a first error detection code computed for the first data and a second error detection code computed for the second data; and
    the controller includes repair circuitry configured to
        receive the alarm signal;
        in response to the alarm signal, verify the first data using the first error detection code and verify the second data using the second error detection code;
        based on the verifying of the first data and the verifying of the second data, determine that one of the first data or the second data comprises corrupted data and that an other of the first data or the second data comprises uncorrupted data; and
        repair the corrupted data based on the uncorrupted data.

3. The system of claim 2, wherein the first error detection code comprises a cyclic redundancy check (CRC) code and the second error detection code comprises a cyclic redundancy check (CRC) code.

4. The system of claim 2, wherein the first error detection code is stored in a third partition of the non-volatile memory and the second error detection code is stored in a fourth partition of the non-volatile memory, wherein the first partition, the second partition, the third partition, and the fourth partition are non-overlapping.

5. The system of claim 4, wherein
    the non-volatile memory stores third data comprising repair code, wherein the repair code comprises processor-executable instructions; and
    the repair circuitry is configured to, in response to receiving the alarm signal,
        fetch the third data from the non-volatile memory; and
        execute the repair code to verify the first data and the second data and repair the corrupted data.

6. The system of claim 5, wherein
    the non-volatile memory stores fourth data corresponding to a copy of the third data; and
    the comparator circuitry is configured to
        receive a portion of the third data and a portion of the fourth data, wherein the portion of the fourth data corresponds to the portion of the third data;
        compare the portion of the third data to the portion of the fourth data,
        when the portion of the third data matches the portion of the fourth data, provide the portion of the third data to the repair circuitry, and
        when the portion of the third data does not match the portion of the fourth data, generate an alarm signal and refrain from providing the portion of the third data or the portion of the fourth data to the repair circuitry.

7. The system of claim 1, wherein the comparator circuitry is further configured to refrain from providing the portion of the first data or the portion of the second data to the one or more processors when the portion of the first data does not match the portion of the second data.

8. A method for updating a non-volatile memory, comprising:
    receiving an update instruction that includes first data corresponding to program code and a first error detection code for the first data;
    storing the first data in a first partition of the non-volatile memory;
    storing the first error detection code in a second partition of the non-volatile memory;
    verifying the first data using the first error detection code;
    in response to the first data being successfully verified,
        generating second data corresponding to a copy or an inverted copy of the first data;
        storing the second data in a third partition of the non-volatile memory,
        computing a second error detection code for the second data; and storing the second error detection code in a fourth partition of the non-volatile memory.

9. The method of claim 8, wherein the first error detection code or the second error detection code comprises a cyclic redundancy check (CRC) code.

10. The method of claim 8, wherein the first partition, the second partition, the third partition, and the fourth partition are non-overlapping.

11. A system on chip, comprising:
a serial peripheral interface (SPI) configured to be coupled to an external memory storing program code;
one or more processors configured to execute the program code; and
comparator circuitry configured to
receive, from the SPI, a portion of first data from a first partition of the external memory, wherein the first data corresponds to the program code;
receive, from the SPI, a portion of second data from a second partition of the external memory, wherein the second data corresponds to a copy of the first data;
compare the portion of the first data to the portion of the second data,
when the portion of the first data matches the portion of the second data, provide the portion of the first data to the one or more processors, and
when the portion of the first data does not match the portion of the second data, generate an alarm signal.

12. The system on chip of claim 11, wherein the second data comprises an inverted copy of the first data.

13. The system on chip of claim 11, further comprising repair circuitry configured to:
receive the alarm signal, and in response fetch a first error detection code stored in a third partition of the external memory;
fetch a second error detection code stored in a fourth partition of the external memory;
verify the first data using a first error detection code;
verify the second data using the second error detection code;
based on the verifying of the first data and the verifying of the second data, determine that one of the first data or the second data comprises corrupted data and that an other of the first data or the second data comprises uncorrupted data; and
repair the corrupted data based on the uncorrupted data.

14. The system on chip of claim 13, wherein the first error detection code comprises a cyclic redundancy check (CRC) code and the second error detection code comprises a cyclic redundancy check (CRC) code.

15. The system on chip of claim 13, wherein the first partition, the second partition, the third partition, and the fourth partition are non-overlapping.

16. The system on chip of claim 13, wherein the repair circuitry is configured to, in response to receiving the alarm signal,
fetch repair code from the external memory; and
execute the repair code to verify the first data and the second data and repair the corrupted data.

17. A method, comprising:
receiving a portion of first data from a first partition of an external memory, wherein the first data corresponds to a program code;
receiving a portion of second data from a second partition of the external memory, wherein the second data corresponds to a copy of the first data;
comparing the portion of the first data to the portion of the second data,
when the portion of the first data matches the portion of the second data, providing the portion of the first data to one or more processors for execution, and
when the portion of the first data does not match the portion of the second data,
fetching respective portions of third data from a third partition of the external memory, wherein the third data comprises processor-executable instructions;
fetching respective portions of fourth data from a fourth partition of the external memory, wherein the fourth data comprises a copy of the third data and the portion of the fourth data corresponds to the portion of the third data;
comparing the respective portions of the third data to the respective portion of the fourth data,
when a portion of the third data does not match a portion of the fourth data, generate an alarm signal and refrain executing the processor-executable instructions,
when the respective portions of the third data match the respective portions of the fourth data, execute the executable instructions to
receive a first error detection code computed for the first data,
receive a second error detection code computed for the second data,
verify the first data using the first error detection code and verify the second data using the second error detection code,
based on the verifying of the first data and the second data, determining that the first data comprises corrupted data and the second data comprises uncorrupted data, and
repair the first data based on the second data.

18. The method of claim 17, wherein the first error detection code is stored in the third partition of the external memory and the second error detection code is stored in the fourth partition of the external memory, wherein the first partition, the second partition, the third partition, and the fourth partition are non-overlapping.

19. The method of claim 18, wherein the first error detection code comprises a cyclic redundancy check (CRC) code and the second error detection code comprises a cyclic redundancy check (CRC) code.

20. The method of claim 17, further comprising refraining from providing the portion of the first data or the portion of the second data to the one or more processors when the portion of the first data does not match the portion of the second data.

* * * * *